United States Patent [19]

Miyake et al.

[11] 4,421,891
[45] Dec. 20, 1983

[54] BEAD FILLER RUBBER COMPOSITION

[75] Inventors: Itsuo Miyake, Kodaira; Keizo Okamoto, Higashikurume; Motonori Bundo, Higashimurayama; Akihiro Noda, Kodaira, all of Japan

[73] Assignee: Bridgestone Tire Company Limited, Tokyo, Japan

[21] Appl. No.: 238,875

[22] Filed: Feb. 27, 1981

Related U.S. Application Data

[63] Continuation of Ser. No. 85,346, Oct. 16, 1979, abandoned.

[30] Foreign Application Priority Data

Oct. 18, 1978 [JP] Japan ................................ 53-127256

[51] Int. Cl.³ ........................ C08L 61/14; C08L 7/00
[52] U.S. Cl. ................................ 524/495; 152/362 R; 524/511; 524/575.1; 525/139; 260/727; 260/775; 260/779 R
[58] Field of Search ................ 524/495, 511; 525/139; 152/362 R; 260/727, 775, 779 R

[56] References Cited

U.S. PATENT DOCUMENTS

| | | | |
|---|---|---|---|
| 3,586,735 | 6/1971 | Giller et al. | 525/139 |
| 4,014,827 | 3/1977 | Hart et al. | 524/511 |
| 4,067,373 | 1/1978 | Delobelle et al. | 152/354 R |
| 4,250,939 | 2/1981 | Shibata et al. | 156/362 R |

FOREIGN PATENT DOCUMENTS 1260138 3/1961 France .

*Primary Examiner*—Theodore E. Pertilla
*Attorney, Agent, or Firm*—Sughrue, Mion, Zinn, Macpeak, and Seas

[57] ABSTRACT

A rubber composition comprising rubber, novolak-type phenolic resin and carbon black is very rigid and is adapted to be used as a bead filler rubber of a tire. Tires using the rubber composition are excellent in the high speed performance, lateral rigidity, ride feeling and durability.

8 Claims, 2 Drawing Figures

BEAD FILLER RUBBER COMPOSITION

This is a continuation of application Ser. No. 85,346, filed Oct. 16, 1979, now abandoned.

BACKGROUND OF THE INVENTION

1. Field of the Invention

The present invention relates to a rubber composition, and more particularly, relates to a super rigid rubber composition comprising rubber, novolak-type phenolic resin and carbon black, and adapted to be used as a bead filler rubber of a tire.

2. Description of the Prior Art

There have been variously investigated the structure of bead portion of radial tire in order to satisfy the rigidity and durability required to tire. For example, it has been attempted to improve the dynamic performance and durability of tire by arranging a bead-reinforcing layer in the bead portion. However, this method has drawbacks that a large number of production steps are necessary and the productivity of the tire is very poor.

Japanese Utility Model Application No. 16,084/72, French Patent No. 1,260,138 and U.S. Pat. No. 4,067,373 disclose methods for improving the running performance and other property by arranging super rigid rubber in the bead portion. However, these methods do not substantially think of rubber, which can develop fully a function as a bead filler rubber subjected to complicated forces during the running of a tire and can give a sufficiently high durability to a rubber tire.

While, it is well known to use novolak-type phenolic resin in the production of rigid rubber compositions. However, these rubber compositions substantially concern nitrile rubber and neoprene rubber having a high compatibility with the resin. The nitrile rubber series of neoprene rubber series rigid rubber is very difficult to be vulcanized together with natural rubber, polybutadiene rubber and the like, which are commonly used as a rubber for tire, and therefore when the nitrile rubber series or neoprene rubber series rigid rubber is used as a tire part, the rubber is apt to be separated from natural rubber, polybutadiene rubber or the like, and can not be practically used.

In order to solve the above described drawbacks, the inventors have variously investigated how to produce a super rigid rubber composition by compounding novolak-type phenolic resin to natural rubber, polybutadiene rubber or the like, and found out the following facts. Novolak-type phenolic resin is essentially incompatible with natural rubber and other rubbers. Therefore, novolak-type phenolic resin is formed into spherical agglomerates during the kneading commonly carried out in the production of rubber, and has the filling effect only. This phenomenon still occurs even when various resins are used as a resin in place of novolak-type phenolic resin for producing a homogenous mixture of the resin with the rubber. However, when novolak-type phenolic resin is compounded to natural rubber or other rubber together with carbon black, the mixture of the resin and carbon black exhibits a reinforcing effect on the rubber, which is completely different from the reinforcing effect of the resin alone on the rubber or the reinforcing effect of the carbon black alone on the rubber, depending upon the mixing ratio of the resin to the carbon black, and a super rigid rubber composition having a durability remarkably superior to that of conventional resin-reinforced rubber can be obtained. That is, when natural rubber or diene series rubber is mixed with novolak-type phenolic resin, which is essentially incompatible with the rubber, the resin is separated from the rubber to form island-like large agglomerates in the mixture, but when a mixture of novolak-type phenolic resin and carbon black is compounded to natural rubber or other diene series rubber, the resin disperses uniformly in the rubber without forming large agglomerates similarly to the dispersed state in an ordinary mixture of rubber and carbon black. This action of carbon black to the resin is highly influenced by the mixing ratio of the carbon black to the resin and by the kind of the carbon black. Based on the discovery, the inventors have accomplished the present invention.

SUMMARY OF THE INVENTION

The feature of the present invention is the provision of a bead filler rubber composition, comprising 100 parts by weight of a rubber selected from the group consisting of natural rubber, polyisoprene rubber, polybutadiene rubber, styrene-butadiene copolymer rubber and blends thereof, 40–130 parts by weight of carbon black, 15–45 parts by weight based on 100 parts by weight of the carbon black of at least one of novolak-type phenolic resin and novolak-type modified phenolic resin, and a hardener for the resin.

DESCRIPTION OF THE PREFERRED EMBODIMENTS

Figure 1:
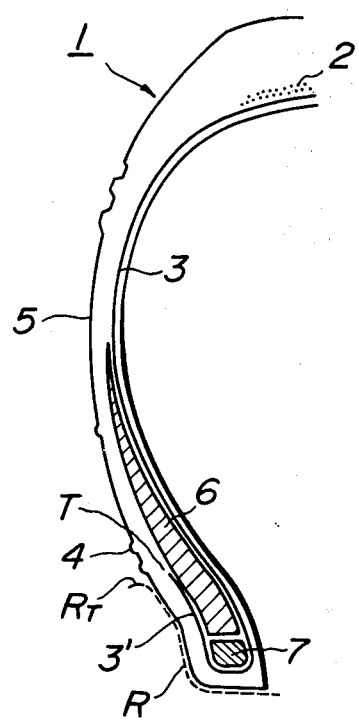
FIG. 1 is a cross-sectional view of the side portion of a tire according to the present invention.

The rubber to be used in the present invention includes natural rubber, polyisoprene rubber, polybutadiene rubber, styrene-butadiene copolymer rubber and blends thereof. Carbon black is compounded to the rubber in an amount of 40–130 parts by weight, preferably 60–120 parts by weight, more preferably 65–85 parts by weight, based on 100 parts by weight of the rubber. The use of carbon black in an amount of less than 40 parts by weight is too small to disperse homogeneously the necessary amount of resin for reinforcing the rubber. While, when the amount of carbon black is more than 130 parts by weight, the resulting rubber composition is brittle and is very poor in the durability. Further, in the present invention, carbon black having an iodine adsorbability (IA) of 40–130 mg/g and a dibutyl phthalate absorbability (DBP) of not more than 130 ml/100 g defined in ASTM D 1765 is preferably used. Carbon black having an IA of less than 40 mg/g affects adversely the dispersibility of the resin, and carbon black having an IA of more than 130 mg/g is poor in the dispersibility in itself. Therefore, the use of such carbon black is not preferable. When carbon black has a DBP of more then 130 ml/100 g, the carbon black used in an amount sufficient to disperse the resin can not be fully dispersed in the rubber.

In the present invention, the above described carbon black is used together with at least one of novolak-type phenolic resin and novolak-type modified phenolic resin. The novolak-type phenolic resin includes novolak-type phenol resin, novolak-type cresol resin and novolak-type resorcinol resin. The novolak-type modified phenolic resin includes resins obtained by modifying the above described novolak-type phenolic resin with oils, such as rosin oil, tall oil, cashew nut oil, linoleic acid, oleic acid, linolenic acid and the like; resins obtained by modifying the novolak-type phenolic resin with aromatic hydrocarbons, such as xylene, mesitylene and the like; resins obtained by modifying the novolak-type phenolic resin with rubbers, such as nitrile rubber and the like. These resins are added to the rubber in an amount of 15-45 parts by weight, preferably 20-40 parts by weight, based on 100 parts by weight of carbon black. When the amount of resin is less than 15 parts by weight, the effect of the resin does not substantially appear, while when the amount of resin exceeds 45 parts by weight, excess resin forms agglomerates to cause phase separation in the resulting rubber composition, and deteriorates noticeably the physical properties of the rubber composition.

Further, in the present invention, a mixture of the novolak-type phenolic resin and the novolak-type modified phenolic resin is preferably used, because the use of the mixture can improve synergistically the durability of the resulting rubber composition as compared with the case where these resins are used alone. In this case, the mixing ratio of novolak-type phenolic resin to novolak-type modified phenolic resin, particularly the mixing ratio of novolak-type phenol resin to novolak-type cashew modified phenol resin or to novolak-type tall oil modified phenol resin, shoud be 80/20-20/80, preferably 60/40-40/60.

In the present invention, as the hardener for the resin, aldehyde-donors, that is, aldehyde-generating agents, such as hexamethylenetetramine, paraformaldehyde, hexamethoxymethylmelamine and the like, are preferably used. The hardener is used in an amount enough to harden the resin.

In the present invention, in addition to the above described ingredients, vulcanizing agents, such as sulfur, N,N'-dithiodiamines, thiurums and the like, vulcanization accelerator, antioxidant, fillers other than carbon black, such as silica and the like, process oil and other additives may be contained in the rubber composition.

The following examples are given for the purpose of illustration of this invention and are not intended as limitations thereof.

EXAMPLE 1

Homogeneous rubber compositions having a compounding recipe (parts by weight) shown in the following Table 1 were vulcanized at 145° C. for 40 minutes in a press to produce vulcanized rubber sheets having a thickness of 2 mm. The elongation at break (Eb), 20% modulus and dynamic modulus of the rubber sheets are shown in Table 1. The elongation at break and 20% modulus were measured with respect to an ASTM F type dumbbell according to ASTM D 412. The dynamic modulus was measured at room temperature with respect to a strip-shaped sample having a length of 25 mm, a width of 5 mm and a thickness of 2 mm by means of a high-power spectrometer made by Iwamoto Seisakusho by vibrating the sample at a frequency of 10 Hz and under a dynamic strain of 2%, the sample being used under an elongated state of 5% obtained by applying a static pressure.

It can be seen from Table 1 that a rubber composition containing resin and carbon black in a mixing ratio defined in the present invention has remarkably improved 20% modulus and dynamic modulus, and further has a satisfactorily high elongation at break for practical use.

In order to make a tire light in weight and to improve the ride feeling thereof, provision was made of a tire 1 shown in FIG. 1, which had a size of 165 SR 13 and comprised a belt layer 2 composed of two steel cord plies and a carcass layer 3 composed of one ply formed of polyethylene terephthalate fiber of 1500 d/2 and a bead filler 6, the carcass ply having a turn-up portion 3' extending up to a low position near a rim flange $R_T$. In FIG. 1, the numeral 4 represents a bead portion, the numeral 5 represents a side wall portion, the numeral 7 represents a bead wire, and the letter R represents a rim. Rubber composition No. 1, No. 3, No. 5, No. 7 and No. 8 shown in Table 1 were used as a rubber for the bead filler 6 of the tire shown in FIG. 1, and the high speed performance, lateral rigidity index, ride feeling and durability (condition A) of the tire were evaluated. The obtained results are shown in the following Table 2.

Figure 2:
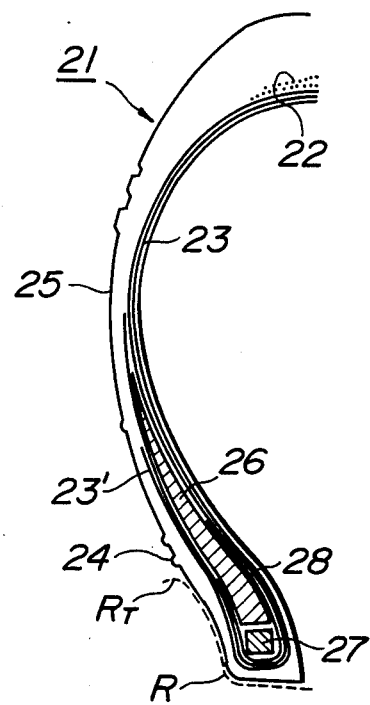
FIG. 2 is a cross-sectional view of the side portion of a conventional tire.

For comparison, rubber composition No. 1 (conventional rubber composition) described in Table 1 was used as a rubber for the bead filler 26 of a conventional tire 21 shown in FIG. 2, which had a structure that the turn-up portion 23' of a carcass ply extended up to the vicinity of the maximum width portion of the side wall portion 25. In FIG. 2, the numeral 22 represents a belt layer, the numeral 23 represents a carcass layer, the numeral 24 represents a bead portion, the numeral 27 represents a bead wire, the numeral 28 represents a cord layer, the letter R represents a rim and the letter $R_T$ represents a rim flange. The high speed performance, lateral rigidity index, ride feeling and durability (condition A) of the tire 21 using Rubber composition No. 1 were evaluated. The obtained results are also shown in Table 2.

The evaluation of the performances was carried out in the following manner.

(1) High speed performance:

A tire is assembled in a 4½ J rim, inflated under an internal pressure of 2.1 kg/cm² and pressed on a drum having a diameter of 1.7 m under a load of 390 kg/cm². The tire is run on the drum at a speed of 80 km/hr for 2 hours and left to stand for 3 hours. Then, the tire is run at a speed of 121 km/hr for 30 minutes. When the tire runs without trouble, the speed is raised stepwise by 8 km/hr every 30 minutes. The high speed performance of the tire is evaluated by the speed at the breakage of the tire and by the running time until the breakage at the speed.

(2) Lateral rigidity index:

A tire is assembled in a 4½ J rim and inflated under an internal pressure of 1.7 kg/cm². The tire is pressed and fixed to a push car, which has a jagged non-slip surface, under a vertical load of 320 kg, the push car is pulled in a direction perpendicular to the direction of the tire, and the lateral road, which is caused at a lateral shift of the tire of 15 mm, is measured. The lateral rigidity index of a sample tire is indicated by the ratio of the lateral road of the sample tire to that, calculated as 100, of Conventional tire A.

(3) Ride feeling:

The ride feelings of the above obtained tires were compared with each other by the impact index and damping index measured in the following manner.

A tire is travelled at a speed of 50 km/hr on a road having rubber projections of 10 mm height fixed thereto, and the vibration subjected to the tire in the up-and-down direction is measured in the form of a reaction in the rotating shaft of the tire by means of an acceleration meter. The impact absorbing property of a sample tire is indicated by the impact index, which is the reciprocal of the ratio of the amplitude in the first period of the above measured wave shape in the tire to that, calculaed as 100, in Conventional tire A.

The vibration damping property of a sample tire is indicated by the damping index, which is the recprocal of the ratio of the damping coefficient calculated from the above measured wave shape in the tire to that, calculated as 100, in Conventional tire A.

(4) Durability (condition A):

A tire is assembled in a 4½ J rim, and pressed on a metal drum having a diameter of 1.7 m under an overload and over internal pressure condition that the strain energy concentrated to the turn-up end of the carcass ply is as large as about 4 times of the strain energy in a practically running tire. Then, the tire is run at a speed of 60 km/hr, and the durability of the tire is shown by the running distance until breakage occurs at the turn-up end of carcass ply. When the running distance of a tire without trouble is over 30,000 km, the tire is evaluated as an acceptable tire.

TABLE 1

| Rubber composition No. | 1 | 2 | 3 | 4 | 5 | 6 | 7 | 8 | 9 | 10 |
|---|---|---|---|---|---|---|---|---|---|---|
| Compounding recipe (parts by weight) | | | | | | | | | | |
| Natural rubber | 100 | 100 | 100 | 100 | 100 | 100 | 100 | 100 | 50 | 50 |
| Styrene-butadiene copolymer rubber | | | | | | | | | 50 | |
| Polybutadiene rubber | | | | | | | | | | 50 |
| Carbon black* | 70 | | 70 | 70 | 70 | 70 | 70 | 100 | 70 | 70 |
| Novalak-type cashew modified phenol resin** | | 20 | 8 | 14 | 20 | 26 | 40 | 30 | 20 | 20 |
| Stearic acid | 2 | 2 | 2 | 2 | 2 | 2 | 2 | 2 | 2 | 2 |
| Zinc white | 7.5 | 7.5 | 7.5 | 7.5 | 7.5 | 7.5 | 7.5 | 7.5 | 7.5 | 7.5 |
| N—oxydiethylenebenzothiazole sulfeneamide | 1.5 | 1.5 | 1.5 | 1.5 | 1.5 | 1.5 | 1.5 | 1.5 | 1.5 | 1.5 |
| Sulfur | 4 | 4 | 4 | 4 | 4 | 4 | 4 | 4 | 4 | 4 |
| Hexamethylenetetramine | | 2 | 0.8 | 1.4 | 2.0 | 2.6 | 4.0 | 3.0 | 2.0 | 2.0 |
| Property | | | | | | | | | | |
| Elongation at break (%) | 170 | 380 | 220 | 230 | 225 | 200 | 100 | 145 | 220 | 190 |
| 20% modulus (kg/cm$^2$) | 13.5 | 7.5 | 35.0 | 43.0 | 60.5 | 69.0 | 92.0 | 89.0 | 55.0 | 63.5 |
| Dynamic modulus (kg/cm$^2$) | 120 | 40 | 350 | 520 | 730 | 890 | 1,530 | 1,420 | 710 | 775 |

*IA:82 mg/g. DBP:102 ml/100 g
**Novolak-type phenol resin obtained by modifying 100 parts by weight of phenol with 40 parts by weight of cashoew nut oil

TABLE 2

| Tire | A | B | C | D | E | F |
|---|---|---|---|---|---|---|
| Tire structure | FIG. 2 | FIG. 1 | FIG. 1 | FIG. 1 | FIG. 1 | FIG. 1 |
| Rubber composition used in bead filler | No. 1 | No. 1 | No. 3 | No. 5 | No. 7 | No. 8 |
| Performance | | | | | | |
| High-speed performance | | | | | | |
| Speed (km/h) | 185 | 169 | 177 | 185 | 193 | 193 |
| Running time (min) | 23 | 28 | 27 | 28 | 2 | 4 |
| Lateral rigidity index | 100 | 75 | 93 | 103 | 112 | 110 |
| Ride feeling | | | | | | |
| Impact index | 100 | 115 | 112 | 109 | 105 | 106 |
| Damping index | 100 | 86 | 93 | 110 | 115 | 113 |
| Durability (condition A) | run over 30,000 km | 11,000 km | 21,500 km | run over 30,000 km | 16,500 km | run over 30,000 km |

It can be seen from Table 2 that, when the rubber composition of the present invention is used as a bead filler rubber of a tire, the tire has equal or superior to Conventional tire A in the high speed performance, cornering stability and durability and further is remarkably superior to Conventional tire A in the ride feeling.

EXAMPLE 2

Rubber compositions were produced in the same compounding recipe as that of Rubber composition No. 5 in Table 1, except that only the carbon black is replaced by carbon blacks shown in the following Table 3. The viscosity of the resulting rubber compositions was measured according to JIS K 6300, and the elongation at break, 20% modulus and dynamic modulus thereof were measured in the same manner as described in Example 1. Then, tires having a structure shown in FIG. 1 were produced by the use of the rubber compositions, and the performances of the tires were evaluated in the same manner as described in Example 1. The obtained results are shown in Table 3.

TABLE 3

| Rubber Composition No. | 11 | 12 | 13 | 5 | 15 | 16 | 17 |
|---|---|---|---|---|---|---|---|
| Carbon black | | | | | | | |
| IA (mg/g) | 36 | 43 | 86 | 82 | 84 | 121 | 145 |
| DBP (ml/100 g) | 91 | 121 | 60 | 102 | 150 | 114 | 113 |
| Property | | | | | | | |
| Mooney viscosity | 66 | 73 | 85 | 92 | 125 | 105 | 132 |
| Elongation at break (%) | 200 | 220 | 250 | 225 | 200 | 210 | 190 |
| 20% modulus (kg/cm$^2$) | 38.5 | 50.5 | 51.5 | 60.5 | 45.0 | 53.0 | 42.5 |

TABLE 3-continued

| Dynamic modulus (kg/cm$^2$) | 420 | 610 | 625 | 750 | 595 | 715 | 530 |
|---|---|---|---|---|---|---|---|
| Tire | G | H | I | D | | J | |
| Performance | | | | | | | |
| High-speed performance | | | | | | | |
| Speed (km/hr) | 185 | 185 | 185 | 185 | | 185 | |
| running time (min) | 10 | 21 | 20 | 28 | | 20 | |
| Lateral rigidity index | 95 | 97 | 97 | 103 | | 98 | |
| Durability (condition A) | 18,000 km | run over 30,000 km | run over 30,000 km | run over 30,000 km | | run over 30,000 km | |

It can be seen from Table 3 that tires having more improved durability can be obtained by the use of carbon black having an IA of 40–130 mg/g and a DBP of not higher than 130 ml/100 g. Rubber composition No. 15 and No. 17 are very poor in the fluidity in the unvulcanized state, and are very difficult in the extrusion-molding. Therefore, the evaluation of tires using the rubber compositions are omitted.

EXAMPLE 3

Rubber compositions were produced according to the compounding recipe shown in the following Table 4. The fatigue life of the rubber compositions was measured in the method as explained later, and other properties thereof were measured in the same manner as described in Example 1. The obtained results are shown in Table 4.

The fatigue life of the rubber composition was measured in the following manner according to ASTM D 412. That is, an ASTM F type dumbbell of the rubber composition was fixed under an elongated state of 35% and vibrated at 170° C. by means of an elongation type fatigue tester, and the number of vibrations until the durmbbell was broken was measured.

Then, tires having a structure shown in FIG. 1 were produced by the use of Rubber composition Nos. 22–26 shown in Table 4, and the performance of the tires was evaluated in the same manner as described in Example 1. In this case, the durability of the tires was evaluated, not only under condition A, but also under a more severe condition (condition B), that is, under a super overload and super over internal pressure condition, wherein strain energy concentrated to the turn-up end of carcass ply is as large as 8 times of the strain energy in a practically running tire. The obtained results are shown in Table 5.

It can be seen from Tables 4 and 5 that, when unmodified phenolic resin is used together with modified phenolic resin, the resulting rubber composition has a synergistically improved durability.

TABLE 4

| Rubber Composition No. | 18 | 19 | 20 | 21 | 22 | 23 | 24 | 25 | 26 |
|---|---|---|---|---|---|---|---|---|---|
| Compounding recipe (parts by weight) | | | | | | | | | |
| Natural rubber | 100 | 100 | 100 | 100 | 100 | 100 | 100 | 100 | 100 |
| Carbon black* | 75 | 75 | 75 | 75 | 75 | 75 | 75 | 75 | 75 |
| Cashew-modified phenol resin** | 24 | 18 | 18 | 6 | | | | | |
| Phenol resin*** | | 6 | 12 | 18 | 24 | 18 | 12 | 6 | |
| Tall oil-modified phenol resin**** | | | | | | 6 | 12 | 18 | 24 |
| Stearic acid | 2 | 2 | 2 | 2 | 2 | 2 | 2 | 2 | 2 |
| Zinc white | 10 | 10 | 10 | 10 | 10 | 10 | 10 | 10 | 10 |
| N—oxydiethylenebenzothiazole sulfeneamide | 1 | 1 | 1 | 1 | 1 | 1 | 1 | 1 | 1 |
| Sulfur | 6 | 6 | 6 | 6 | 6 | 6 | 6 | 6 | 6 |
| Hexamethylenetetramine | 2.4 | 2.4 | 2.4 | 2.4 | 2.4 | 2.4 | 2.4 | 2.4 | 2.4 |
| Property | | | | | | | | | |
| Elongation at break (%) | 160 | 160 | 155 | 140 | 120 | 145 | 170 | 165 | 160 |
| 20% modulus (kg/cm$^2$) | 72 | 70 | 67 | 58 | 52 | 58 | 65 | 66 | 67 |
| Dynamic modulus (kg/cm$^2$) | 980 | 920 | 890 | 715 | 650 | 710 | 780 | 840 | 880 |
| Fatigue life (number of vibrations) | $2 \times 10^6$ | $3 \times 10^6$ | $5 \times 10^6$ | $4 \times 10^6$ | $3 \times 10^6$ | $6 \times 10^6$ | $8 \times 10^6$ | $4 \times 10^6$ | $1 \times 10^6$ |

*IA:82 mg/g, DBP:102 ml/100 g
**Novolak-type phenol resin obtained by modifying 100 parts by weight of phenol with 40 parts by weight of cashew nut oil
***Unmodified novolak-type phenol resin
****Novolak-type phenol resin obtained by modifying 100 parts by weight of phenol with 40 parts by weight of tall oil

TABLE 5

| Tire | K | L | M | N | O |
|---|---|---|---|---|---|
| Rubber composition used in bead filler | No. 22 | No. 23 | No. 24 | No. 25 | No. 26 |
| High speed performance | | | | | |
| Speed (km/h) | 185 | 185 | 185 | 185 | 185 |
| Running time (min) | 12 | 21 | 28 | 27 | 28 |
| Lateral rigidity index | 98 | 101 | 105 | 106 | 106 |
| Durability (condition A) | run over 30,000 km | run over 30,000 km | run over 30,000 km | run over 30,000 km | run over 30,000 km |
| Durability (condition B) | rubber is broken after 9,800 km running | run over 13,000 km | run over 13,000 km | run over 13,000 km | rubber is broken after 13,000 km running |

What is claimed is:

1. A bead filler rubber composition, consisting essentially of:
   (a) 100 parts by weight of a rubber selected from the group consisting of natural rubber, polyisoprene rubber, polybutadiene rubber, styrene-butadiene copolymer rubber and blends thereof;
   (b) 40–130 parts by weight of carbon black having an iodine adsorbability of 40–130 mg/g and a dibutyl phthalate absorbability of not higher than 130 ml/100 g;
   (c) 15–45 parts by weight per 100 parts by weight of carbon black of a mixture of a novolak phenolic resin selected from the group consisting of novolak phenol resin, novolak cresol resin, novolak resorcinol resin; and a novolak modified phenolic resin obtained by modifying with a compound selected from the group consisting of oils, aromatic hydrocarbons, or rubbers, wherein the mixing ratio of the novolak phenolic resin to the novolak modified phenolic resin is from 80/20 to 20/80 by weight, an effective amount of a hardener for the resin.

2. A bead filler rubber composition according to claim 1, wherein the amount of the carbon black is 60–120 parts by weight based on 100 parts by weight of the rubber.

3. A bead filler rubber composition according to claim 1, wherein the amount of the novolak-type phenolic resin is 20–40 parts by weight based on 100 parts by weight of the carbon black.

4. A bead filler rubber composition according to claim 1, wherein the mixing ratio of the novolak phenolic resin/the modified novolak phenolic resin is 60/40-40/60.

5. A bead filler rubber composition according to claim 1 wherein said novolak modified phenolic resins are novolak phenolic resins modified with an oil selected from the group consisting of rosin oil, tall oil and cashew nut oil.

6. A bead filler rubber composition according to claim 1, wherein said novolak modified phenolic resins are novolak phenolic resins modified with an oil selected from the group consisting of linoleic acid, oleic acid and linolenic acid.

7. A bead filler rubber composition according to claim 1, wherein said novolak modified phenolic resins are novolak phenolic resins modified with an aromatic hydrocarbon selected from the group consisting of xylene and mesitylene.

8. A bead filler rubber composition according to claim 1, wherein said novolak modified phenolic resins are novolak phenolic resins modified with a nitrile rubber.

* * * * *